United States Patent
Mantravadi et al.

(10) Patent No.: US 12,486,159 B2
(45) Date of Patent: Dec. 2, 2025

(54) MICRO-MACHINED ULTRASOUND TRANSDUCERS WITH INSULATION LAYER AND METHODS OF MANUFACTURE

(71) Applicant: Exo Imaging, Inc., Redwood City, CA (US)

(72) Inventors: Naresh Mantravadi, San Jose, CA (US); Haesung Kwon, Austin, TX (US); Brian Bircumshaw, Oakland, CA (US)

(73) Assignee: Exo Imaging, Inc., Santa Clara, CA (US)

( * ) Notice: Subject to any disclaimer, the term of this patent is extended or adjusted under 35 U.S.C. 154(b) by 882 days.

(21) Appl. No.: 17/364,381

(22) Filed: Jun. 30, 2021

(65) Prior Publication Data

US 2023/0002213 A1  Jan. 5, 2023

(51) Int. Cl.
B06B 1/06 (2006.01)
B06B 1/02 (2006.01)
B81B 3/00 (2006.01)
B81C 1/00 (2006.01)

(52) U.S. Cl.
CPC .......... *B81B 3/0021* (2013.01); *B06B 1/0292* (2013.01); *B06B 1/0603* (2013.01); *B81C 1/00158* (2013.01); *B81B 2201/0271* (2013.01); *B81B 2203/0127* (2013.01); *B81B 2203/0315* (2013.01); *B81B 2207/07* (2013.01); *B81C 2201/0132* (2013.01); *B81C 2203/036* (2013.01)

(58) Field of Classification Search
CPC .... B06B 1/0292; B06B 1/0603; B06B 1/0666
See application file for complete search history.

(56) References Cited

U.S. PATENT DOCUMENTS

| | | |
|---|---|---|
| 2,808,522 A | 10/1957 | Dranetz |
| 3,088,323 A | 5/1963 | Walter et al. |
| 4,156,800 A | 5/1979 | Sear et al. |
| 4,211,949 A | 7/1980 | Brisken et al. |
| 4,236,137 A | 11/1980 | Kurtz et al. |

(Continued)

FOREIGN PATENT DOCUMENTS

| | | |
|---|---|---|
| CN | 1445872 A | 10/2003 |
| CN | 1677706 A | 10/2005 |

(Continued)

OTHER PUBLICATIONS

U.S. Appl. No. 17/180,308 Office Action dated Dec. 10, 2021.

(Continued)

*Primary Examiner* — Bryan P Gordon
(74) *Attorney, Agent, or Firm* — Morgan, Lewis & Bockius LLP

(57) ABSTRACT

Disclosed is a multi-silicon on insulator (SOI) micromachined ultrasonic transducer (MUT) device. The device comprises a multi-SOI substrate and a MUT. The MUT is affixed to a surface of the multi-SOI substrate. The multi-SOI substrate has a first SOI layer and at least a second SOI layer disposed above the first SOI layer. The first SOI layer and the second SOI layer each comprise an insulating layer and a semiconducting layer. The first SOI layer further defines a cavity located under a membrane of a MUT and one or more trenches at least partially around a perimeter of the cavity.

19 Claims, 11 Drawing Sheets

(56) References Cited

U.S. PATENT DOCUMENTS

| | | |
|---|---|---|
| 4,375,042 A | 2/1983 | Marcus |
| 4,445,063 A | 4/1984 | Smith |
| 4,517,842 A | 5/1985 | Twomey et al. |
| 4,630,465 A | 12/1986 | Hatton |
| 4,654,554 A | 3/1987 | Kishi |
| 4,668,906 A | 5/1987 | Ekstrand |
| 4,709,360 A | 11/1987 | Martin et al. |
| 5,488,956 A | 2/1996 | Bartelt et al. |
| 5,520,187 A | 5/1996 | Snyder |
| 5,548,564 A | 8/1996 | Smith |
| 5,825,117 A | 10/1998 | Ossmann et al. |
| 5,945,770 A | 8/1999 | Hanafy |
| 6,051,895 A | 4/2000 | Mercier |
| 6,108,121 A | 8/2000 | Mansell et al. |
| 6,359,367 B1 | 3/2002 | Sumanaweera et al. |
| 7,382,635 B2 | 6/2008 | Noda |
| 7,532,093 B1 | 5/2009 | Pulskamp et al. |
| 8,004,158 B2 | 8/2011 | Hielscher |
| 8,182,428 B2 | 5/2012 | Angelsen et al. |
| 8,626,295 B2 | 1/2014 | Doron et al. |
| 9,067,779 B1 | 6/2015 | Rothberg et al. |
| 9,479,875 B2 | 10/2016 | Hall et al. |
| 10,106,397 B1 | 10/2018 | Kim et al. |
| 10,648,852 B2 | 5/2020 | Akkaraju et al. |
| 10,656,007 B2 | 5/2020 | Akkaraju et al. |
| 10,969,270 B2 | 4/2021 | Akkaraju et al. |
| 11,039,814 B2 | 6/2021 | Akkaraju et al. |
| 2002/0109436 A1 | 8/2002 | Peng et al. |
| 2004/0039246 A1 | 2/2004 | Gellman et al. |
| 2004/0085858 A1 | 5/2004 | Khuri-Yakub et al. |
| 2005/0134574 A1 | 6/2005 | Hill |
| 2005/0146247 A1 | 7/2005 | Fisher et al. |
| 2005/0148132 A1 | 7/2005 | Wodnicki |
| 2005/0200242 A1 | 9/2005 | Degertekin |
| 2006/0113866 A1 | 6/2006 | Ganor |
| 2007/0059858 A1 | 3/2007 | Caronti et al. |
| 2007/0103697 A1 | 5/2007 | Degertekin |
| 2007/0120896 A1 | 5/2007 | Stephens et al. |
| 2007/0197922 A1 | 8/2007 | Bradley et al. |
| 2007/0205698 A1 | 9/2007 | Chaggares et al. |
| 2008/0009741 A1 | 1/2008 | Hyuga |
| 2008/0048211 A1 | 2/2008 | Khuri-Yakub et al. |
| 2008/0194053 A1 | 8/2008 | Huang |
| 2009/0001853 A1 | 1/2009 | Adachi et al. |
| 2009/0122651 A1 | 5/2009 | Kupnik et al. |
| 2009/0140609 A1 | 6/2009 | Huang |
| 2009/0250729 A1 | 10/2009 | Lemmerhirt et al. |
| 2010/0020645 A1 | 1/2010 | Wodnicki et al. |
| 2010/0168583 A1 | 7/2010 | Dausch et al. |
| 2010/0225204 A1 | 9/2010 | Hamann et al. |
| 2010/0256501 A1 | 10/2010 | Degertekin |
| 2010/0301227 A1 | 12/2010 | Muntean |
| 2010/0327695 A1 | 12/2010 | Goel et al. |
| 2011/0051461 A1 | 3/2011 | Buchwald et al. |
| 2011/0115333 A1 | 5/2011 | Ezaki |
| 2011/0115337 A1* | 5/2011 | Nakamura ......... H10N 30/2047 |
| | | 29/25.35 |
| 2011/0218594 A1 | 9/2011 | Doron et al. |
| 2012/0068571 A1 | 3/2012 | Chen |
| 2012/0091543 A1 | 4/2012 | Torashima et al. |
| 2012/0103096 A1 | 5/2012 | Kandori |
| 2012/0127136 A1 | 5/2012 | Schneider et al. |
| 2012/0187508 A1 | 7/2012 | Adler et al. |
| 2012/0206014 A1 | 8/2012 | Bibl et al. |
| 2012/0238880 A1 | 9/2012 | Davidsen |
| 2012/0250454 A1 | 10/2012 | Rohling et al. |
| 2012/0289897 A1 | 11/2012 | Friend et al. |
| 2012/0319174 A1 | 12/2012 | Wang |
| 2012/0319535 A1 | 12/2012 | Dausch |
| 2013/0039147 A1 | 2/2013 | Witte et al. |
| 2013/0234559 A1 | 9/2013 | Ermolov |
| 2013/0293065 A1* | 11/2013 | Hajati ................... B06B 1/0629 |
| | | 310/334 |
| 2013/0294201 A1 | 11/2013 | Hajati |
| 2013/0331705 A1 | 12/2013 | Fraser |
| 2014/0019072 A1 | 1/2014 | Alles |
| 2014/0035735 A1 | 2/2014 | Zellers et al. |
| 2014/0117812 A1 | 5/2014 | Hajati |
| 2014/0145561 A1 | 5/2014 | Jin et al. |
| 2014/0155747 A1 | 6/2014 | Bennett et al. |
| 2014/0219063 A1* | 8/2014 | Hajati ..................... B25J 15/12 |
| | | 310/334 |
| 2014/0220723 A1 | 8/2014 | Liu et al. |
| 2014/0225476 A1 | 8/2014 | Degertekin et al. |
| 2014/0328504 A1 | 11/2014 | Stephanou et al. |
| 2015/0097468 A1 | 4/2015 | Hajati et al. |
| 2015/0137285 A1* | 5/2015 | Shim ................... B81C 1/00301 |
| | | 257/416 |
| 2015/0145374 A1 | 5/2015 | Xu et al. |
| 2015/0250452 A1 | 9/2015 | Jin et al. |
| 2015/0265245 A1 | 9/2015 | Von Ramm et al. |
| 2016/0009544 A1* | 1/2016 | Rothberg ................ H01L 24/94 |
| | | 257/737 |
| 2016/0027991 A1 | 1/2016 | Suzuki |
| 2016/0041129 A1 | 2/2016 | Cho et al. |
| 2016/0045935 A1* | 2/2016 | Yoon ..................... B06B 1/0292 |
| | | 310/309 |
| 2016/0105748 A1 | 4/2016 | Pal et al. |
| 2016/0107194 A1 | 4/2016 | Panchawagh et al. |
| 2016/0136686 A1 | 5/2016 | Brock-Fisher |
| 2016/0136687 A1 | 5/2016 | Lewis, Jr. et al. |
| 2016/0262725 A1 | 9/2016 | Boser et al. |
| 2016/0280538 A1 | 9/2016 | Rothberg et al. |
| 2017/0021391 A1* | 1/2017 | Guedes ................. B06B 1/0603 |
| 2017/0209121 A1 | 7/2017 | Davis, Sr. et al. |
| 2017/0232474 A1 | 8/2017 | Oralkan et al. |
| 2017/0309808 A1 | 10/2017 | Hada et al. |
| 2017/0312782 A1 | 11/2017 | Morelli et al. |
| 2017/0319180 A1 | 11/2017 | Henneken et al. |
| 2017/0322290 A1 | 11/2017 | Ng et al. |
| 2017/0368574 A1 | 12/2017 | Sammoura et al. |
| 2018/0141800 A1 | 5/2018 | Cheng et al. |
| 2018/0153510 A1 | 6/2018 | Haque et al. |
| 2019/0176193 A1 | 6/2019 | Shulepov et al. |
| 2019/0316957 A1 | 10/2019 | Akkaraju et al. |
| 2019/0316958 A1 | 10/2019 | Akkaraju et al. |
| 2020/0046320 A1 | 2/2020 | Wodnicki et al. |
| 2020/0156114 A1 | 5/2020 | Gattere et al. |
| 2020/0205776 A1 | 7/2020 | Dekker et al. |
| 2020/0249079 A1 | 8/2020 | Akkaraju et al. |
| 2020/0266798 A1 | 8/2020 | Shelton et al. |
| 2021/0069748 A1 | 3/2021 | Bircumshaw et al. |
| 2021/0078042 A1 | 3/2021 | Bircumshaw et al. |
| 2021/0151661 A1 | 5/2021 | Kwon et al. |
| 2021/0172788 A1 | 6/2021 | Akkaraju et al. |
| 2021/0236090 A1 | 8/2021 | Akkaraju et al. |
| 2021/0364348 A1 | 11/2021 | Akkaraju et al. |
| 2022/0193722 A1 | 6/2022 | Bircumshaw et al. |
| 2022/0205836 A1 | 6/2022 | Akkaraju et al. |

FOREIGN PATENT DOCUMENTS

| | | |
|---|---|---|
| CN | 102577436 A | 7/2012 |
| CN | 104271266 A | 1/2015 |
| CN | 105310718 A | 2/2016 |
| CN | 106500824 A | 3/2017 |
| CN | 106999163 A | 8/2017 |
| CN | 108886659 A | 11/2018 |
| CN | 109416907 A | 3/2019 |
| EP | 0308899 A2 | 3/1989 |
| EP | 1992290 A1 | 11/2008 |
| EP | 1436097 B1 | 2/2016 |
| EP | 3453056 A1 | 3/2019 |
| JP | S61223683 A | 10/1986 |
| JP | S6276392 A | 4/1987 |
| JP | H02218983 A | 8/1990 |
| JP | H06350155 A | 12/1994 |
| JP | 2005295553 A | 10/2005 |
| JP | 2007088805 A | 4/2007 |
| JP | 2007510324 A | 4/2007 |
| JP | 2007229327 A | 9/2007 |
| JP | 2009165212 A | 7/2009 |
| JP | 2012129662 A | 7/2012 |

(56) References Cited

FOREIGN PATENT DOCUMENTS

| | | |
|---|---|---|
| JP | 2012084748 A | 2/2013 |
| JP | 2013518530 A | 5/2013 |
| JP | 2013123150 A | 6/2013 |
| JP | 2014000122 A | 1/2014 |
| JP | 2014127921 A | 7/2014 |
| JP | 2015109634 A | 6/2015 |
| JP | 2015154480 A | 8/2015 |
| JP | 2016503312 A | 2/2016 |
| JP | 2017528940 A | 9/2017 |
| JP | 2018046512 A | 3/2018 |
| JP | 2020107893 A | 7/2020 |
| KR | 20100121544 A | 11/2010 |
| WO | 2001021072 A1 | 3/2001 |
| WO | WO-2006123300 A2 | 11/2006 |
| WO | WO-2007099696 A1 | 9/2007 |
| WO | WO-2011026187 A1 | 3/2011 |
| WO | WO-2011033887 A1 | 3/2011 |
| WO | WO-2012117996 A1 | 9/2012 |
| WO | WO-2013043906 A1 | 3/2013 |
| WO | WO-2013158348 A1 | 10/2013 |
| WO | WO-2015131083 A1 | 9/2015 |
| WO | WO2016054447 A1 | 4/2016 |
| WO | WO-2017025438 A1 | 2/2017 |
| WO | WO-2017132517 A1 | 8/2017 |
| WO | WO-2017182344 A1 | 10/2017 |
| WO | WO-2017216139 A1 | 12/2017 |
| WO | WO-2018102223 A1 | 6/2018 |
| WO | WO-2019164721 A1 | 8/2019 |
| WO | 2019182771 A1 | 9/2019 |
| WO | WO-2019199397 A1 | 10/2019 |
| WO | WO-2019199398 A1 | 10/2019 |
| WO | WO-2019226547 A1 | 11/2019 |
| WO | WO-2020028580 A1 | 2/2020 |
| WO | WO-2021050853 A1 | 3/2021 |

OTHER PUBLICATIONS

Co-pending U.S. Appl. No. 17/215,776, inventors Bircumshaw; Brian et al., filed Mar. 29, 2021.

Co-pending U.S. Appl. No. 17/218,656, inventors Kwon; Haesung et al., filed Mar. 31, 2021.

Co-pending U.S. Appl. No. 17/364,397, inventors Kwon; Haesung et al., filed Jun. 30, 2021.

Hill et al. The Role Radius of Curvature Plays in Thiolated Oligonucleotide Loading on Gold Nanoparticles. ACS Nano 3(2):418-424 (2009) Retrieved on Sep. 2, 2021 from https://www.ncbi.nlm.nih.gov/pmc/articles/PMC3241534.

PCT/US2021/039977 International Search Report and Written Opinion dated Oct. 6, 2021.

PCT/US2021/039994 International Search Report and Written Opinion dated Nov. 5, 2021.

APC International, Ceramic manufacturing series—poling PZT ceramics. https://www.americanpiezo.com/blog/ceramic-manufacturing-series-poling-pzt-ceramics/ [1-3] (2016).

Assef et al., A reconfigurable arbitrary waveform generator using PWM modulation for ultrasound research. BioMedical Engineering OnLine 12:24 [1-13] (2013).

Choudhry et al., Comparison of tissue harmonic imaging with conventional US in abdominal disease. RadioGraphics: Imaging and Therapeutic Technology 20:1127-1135 (2000).

Dahl, Ultrasound beamforming and image formation. http://people.duke.edu/-jjd/RSNA_USbeamforming.pdf [Slide presentation] (c. 2005).

Dausch et al., Theory and operation of 2-D array piezoelectric micromachined ultrasound transducers. IEEE Transactions on Ultrasonics, Ferroelectrics, and Frequency Control 55(11):2484-2492 (2008).

Doerry, Generating nonlinear FM chirp waveforms for radar. Sandia Report, SAND2006-5856:1-34 (2006).

Felix et al., Biplane ultrasound arrays with integrated multiplexing solution for enhanced diagnostic accuracy in endorectal and transvaginal imaging. http://www.vermon.com/vermon/publications/Felix_UFFC_2005.pdf (2005).

Goldman, Apple's Lightning connector and you: what you should know. CNET Sep. 19, 2012: https://www.cnet.com/news/apples-lightning-connector-and-you-what-you-should-know/ (2012).

Guedes et al., Aluminum nitride pMUT based on a flexurally-suspended membrane. IEEE 16th International Solid-State Sensors, Actuators and Microsystems Conference:12169346 (2011).

Hajati et al., Three-dimensional micro electromechanical system piezoelectric ultrasound transducer. Appl. Phys. Lett. 101:253101 (2012).

Harput, Use of chirps in medical ultrasound imaging. Ultrasound Group, School of Electronic and Electrical Engineering, University of Leeds, PhD Thesis, Dec. 2012.

Karki, Signal conditioning piezoelectric sensors. Texas Instruments Application report, SLA033A:1-5 (2000).

Khuri-Yakub et al., Capacitive micro machined ultrasonic transducers for medical imaging and therapy. Journal of Micromech Microeng. 21(5):054004-054014 (2011).

Lach et al., Piezoelectric materials for ultrasonic probes. http://www.ndt.net/article/platte2/platte2.htm NDTnet 1(9):1-9 (1996).

Lee et al., Wafer-to-wafer alignment for three-dimensional integration: a review. Journal of MicroElectroMechanical Systems 20(4):885-898 (2011).

Lu et al., High frequency piezoelectric micromachined ultrasonic transducer array for intravascular ultrasound imaging. Proceedings of the IEEE International Conference on Micro Electro Mechanical Systems (MEMS):06765748 (2014).

Martin, Introduction to B-mode imaging. Cambridge University Press; Diagnostic Ultrasound: Physics and equipment, 2nd Edition. Chapter 1:1-10 (2010).

Mina, High frequency transducers from PZT films. Materials Science and Engineering Thesis; Pennsylvania State University:1-199 (2007).

Moazzami et al., Electrical characteristics of ferroelectric PZT thin films for DRAM applications. IEEE Transaction on Electron Devices 39(9):2044-2049 (1992).

Orenstein Scanning in pain—sonographers seek relief from job-related hazard. Radiology Today 10(8):24 (2009).

Ovland, Coherent plane-wave compounding in medical ultrasound imaging. NTNU-Trondheim, Norwegian University of Science and Technology, Master of Science Thesis, 1-62 (Jun. 2012).

PCT/US2017/063163 International Search Report and Written Opinion dated Feb. 15, 2018.

PCT/US2019/021501 International Search Report and Written Opinion dated Jul. 12, 2019.

PCT/US2019/021515 International Search Report and Written Opinion dated May 31, 2019.

PCT/US2019/033119 International Search Report and Written Opinion dated Aug. 9, 2019.

PCT/US2019/044528 International Search Report and Written Opinion dated Oct. 16, 2019.

PCT/US2020/050374 International Search Report and Written Opinion dated Feb. 2, 2021.

PCT/US2020/050374 Invitation to Pay Additional Fees dated Nov. 13, 2020.

PCT/US2021/024667 International Search Report and Written Opinion dated Jul. 8, 2021.

PCT/US2021/025109 International Search Report and Written Opinion dated Jul. 7, 2021.

Pye et al., Adaptive time gain compensation for ultrasonic imaging. Ultrasound in Medicine and Biology 18(2):205-212 [abstract] (1992).

Rodriguez et al., Low cost matching network for ultrasonic transducers. Physics Procedia 3:1025-1031 (2010).

Smyth, Design and modeling of a PZT thin film based piezoelectric micromachined ultrasonic transducer (PMUT). MSME Thesis, MIT:1-156 (2012).

Spectral doppler. http://www.echocardiographer.org/Echo%20Physics/spectral%20doppler.html (2017).

Szabo. Diagnostic ultrasound imaging: inside out. Elsevier Academic Press, ISBN: 0-12-680145-2 (572 pgs) (2014).

Trots et al., Synthetic aperture method in ultrasound imaging. InTech Press; Ultrasound Imaging, Masayuki Tanabe (Ed.). http://www.intechopen.com/books/ultrasound-imaging/synthetic-aperture-method-in-ultrasound-imaging. Chapter 3:37-56 (2011).

(56) References Cited

OTHER PUBLICATIONS

U.S. Appl. No. 15/820,319 Office Action dated May 14, 2020.
U.S. Appl. No. 15/951,118 Office Action dated Sep. 20, 2019.
U.S. Appl. No. 15/951,121 Office Action dated May 6, 2019.
U.S. Appl. No. 15/951,121 Office Action dated Nov. 19, 2019.
U.S. Appl. No. 16/833,333 Office Action dated Sep. 8, 2020.
U.S. Appl. No. 16/837,800 Office Action dated May 7, 2021.
Wang et al., Broadband piezoelectric micromachined ultrasonic transducer (pMUT) using mode-merged design. Proceedings of the 10th IEEE International Conference on Nano/Micro Engineered and Molecular Systems (IEEE-NEMS 2015):15260900. Xi'an, China, Apr. 7-11, 2015.
Wang et al., Zero-bending piezoelectric micromachined ultrasonic transducer (pMUT) with enhanced transmitting performance. Journal of Microelectromechanical Systems 24(6):2083-2091 (2015).
Zhang et al. Double-SOI wafer-bonded CMUTs with improved electrical safety and minimal roughness of dielectric and electrode surfaces. Journal of microelectromechanical systems 21(3):668-680 (2012).

\* cited by examiner

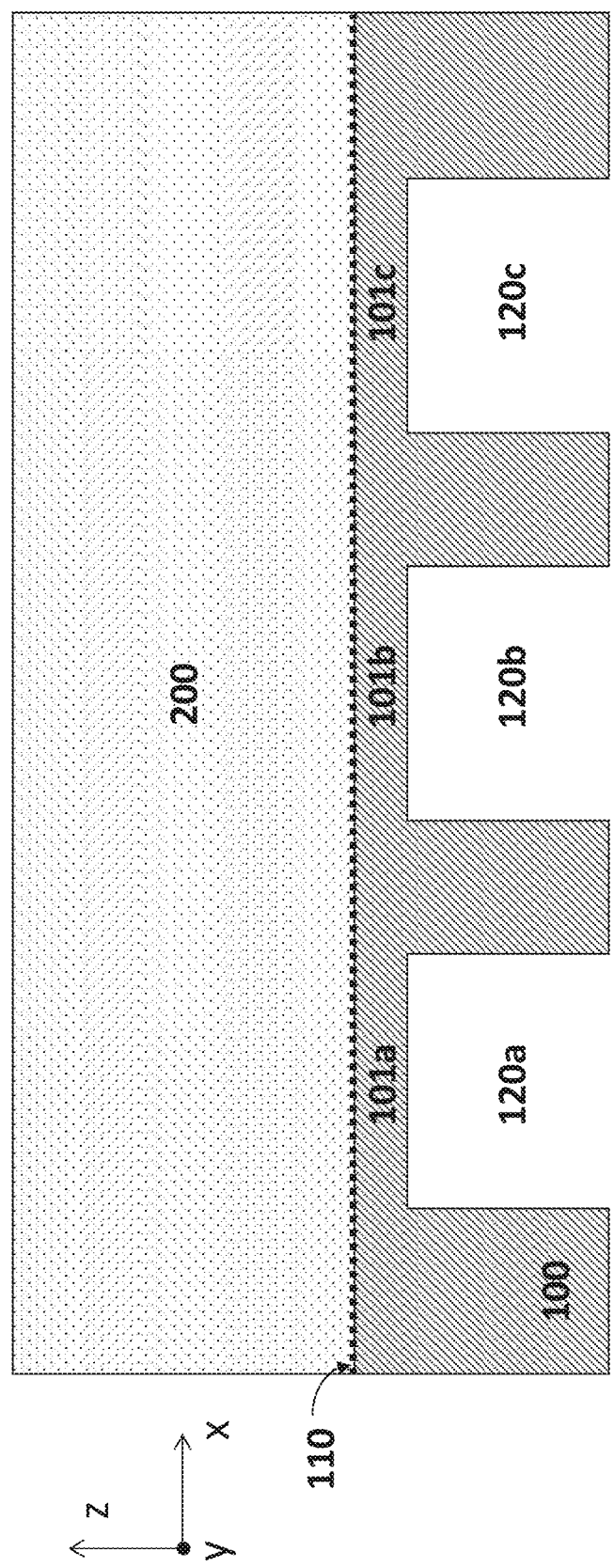

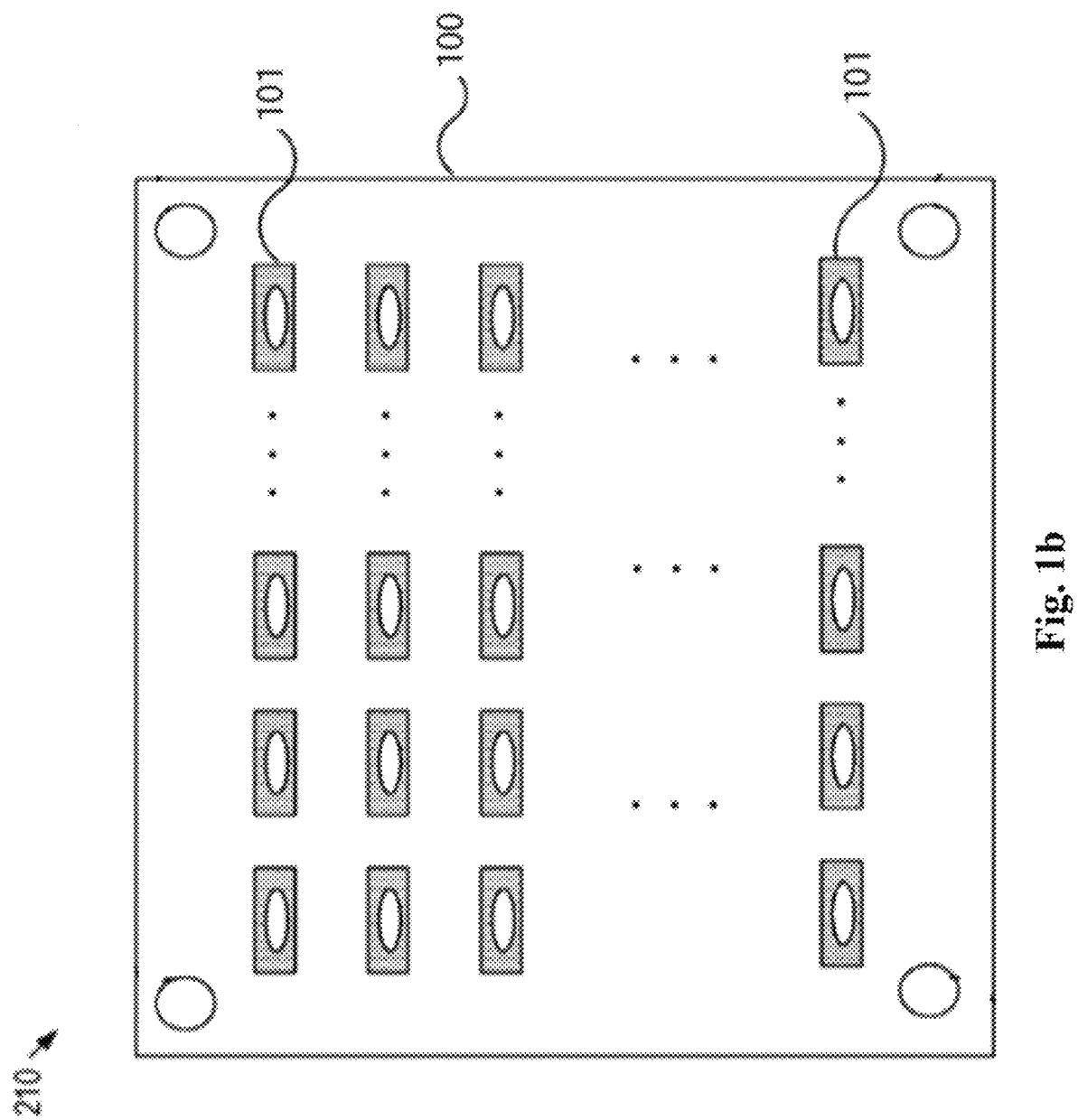

MICRO-MACHINED ULTRASOUND TRANSDUCERS WITH INSULATION LAYER AND METHODS OF MANUFACTURE

BACKGROUND

The present disclosure relates to semi-conductor and micro-electromechanical system (MEMS) technology usable in a medical context, for example, MEMS ultrasound transducers.

Micromachined ultrasonic transducers (MUTs) offer great potential in many fields, including but not limited to medical imaging, air-coupled imaging, distance monitoring, fingerprint monitoring, non-destructive defect monitoring, backside illumination, bio-MEMS, and diagnosis. Crosstalk is an issue often faced by MUTs.

In MEMS devices, use of silicon-on-insulator (SOI) substrates has become more common. SOI wafers enable the manufacture of the most advanced MEMS, complementary metal-oxide-semiconductor (CMOS), power, and radio frequency (RF) components used in consumer, automotive, industrial, and healthcare applications. SOI wafers provide high-quality, single-crystalline silicon layers over a high-quality silicon dioxide layer (buried oxide or BOX) which can be used in the design of several MEMS devices. SOI wafers provide precise control of several material parameters which enable design and manufacture of unique device configurations.

Despite these advantages, conventional SOI wafer technology runs into challenges where precise control of geometries is needed for advanced MEMS devices which need three-dimensional (3D) vertical integration with CMOS circuitry. These challenges have been mitigated by using double-SOI technology, which layers two SOI substrates.

SUMMARY

Double SOI technology may also improve the functionalities of various microelectromechanical systems (MEMS) devices, such as micromachined ultrasonic transducers (MUTs), including piezoelectric MUTs (pMUTs) and capacitive MUTs (cMUTs). Use of double SOI technology may enable designers with more flexibility to size and position cavities (or waveguides) and trenches for etching in the devices' buried oxide (BOX) and semiconductor layers. Thus, a double SOI design may improve acoustic wave transmission (e.g., by increasing wave output power) and reduce crosstalk.

Additionally, the multi-SOI process disclosed herein may enable better critical dimension control during the process of etching trenches and cavities in the MUT device, enhancing design flexibility. Additionally, the multi-SOI process may provide more precise alignment tolerances, mitigating effects from alignment errors.

In some aspects, a multi-silicon on insulator (SOI) micromachined ultrasonic transducer (MUT) device is disclosed. The device comprises a multi-SOI substrate. The device also comprises a MUT having a membrane. The device also discloses the MUT affixed to a surface of the multi-SOI substrate. The device also discloses the multi-SOI substrate comprising a first SOI layer and at least a second SOI layer disposed above the first SOI layer, the first SOI layer and the second SOI layer each comprising an insulating layer and a semiconducting layer. The first SOI layer further comprises a cavity located under the membrane of the MUT. One or more trenches at least partially around a perimeter of the cavity.

In some embodiments, the MUT is a piezoelectric micromachined ultrasound transducer (pMUT).

In some embodiments, the MUT is a capacitive micromachined ultrasound transducer (cMUT).

In some embodiments, the second SOI layer is 40-80 micrometers in height.

In some embodiments, the insulating layer is a buried oxide (BOX) layer.

In some embodiments, the BOX layer is 1-5 micrometers in height.

In some embodiments, the semiconducting layers of the first SOI layer and at least the second SOI layer are handle layers; wherein the cavity is created by etching at least one of the handle layers and the BOX layer.

In some embodiments, the device includes a through silicon via.

In some embodiments, the semiconducting layer is a silicon membrane layer.

In some embodiments, the multi-SOI substrate is a double-SOI substrate.

In some embodiments, the cavity includes a deposited oxide layer.

In some embodiments, the trench is etched to a depth spanning one or more layers of the device.

In some embodiments, the device further includes a handle layer below the first SOI layer.

In some embodiments, the handle layer is a semiconductor layer.

In some embodiments, the semiconducting layer of the second SOI layer includes a metallic coating.

In some embodiments, the cavity is filled with a gas.

In some embodiments, the cavity contains a vacuum.

In some embodiments, the insulating layer comprises a non-oxide insulator.

In an aspect, a multi-silicon on insulator (SOI) micromachined ultrasonic transducer (MUT) array is disclosed. The array comprises a multi-SOI substrate. The array also comprises a plurality of MUTs each having a membrane. The plurality of MUTs was affixed to a surface of the multi-SOI substrate. The multi-SOI substrate comprises a second SOI layer disposed above a first SOI layer, the first SOI layer and the second SOI layer each comprising an insulating layer and a semiconducting layer. The first SOI layer further comprises a plurality of cavities, each cavity located under a membrane of a MUT of the plurality of MUTs. The first SOI layer also comprises one or more trenches at least partially around a perimeter of a cavity of the plurality of cavities of the plurality of MUTs.

In an aspect, a method of manufacturing a double-silicon on insulator (SOI) micromachined ultrasonic transducer (MUT) array. The method comprises defining at least one trench in a first SOI layer by etching an oxide layer of the first SOI layer to contain a width of the at least one trench. The method also comprises applying a photoresist layer to the oxide layer of the first SOI layer. The method also comprises defining a cavity in the first SOI layer by pattern etching the photoresist layer and the oxide layer to contain a width of the cavity. The method also comprises etching the cavity and the at least one trench. The method also comprises applying an oxide layer to the cavity and the at least one trench.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

A better understanding of the features and advantages of the present subject matter will be obtained by reference to the following detailed description that sets forth illustrative embodiments and the accompanying drawings of which:

FIG. 1A is a schematic diagram showing a cross-section of a generalized MUT array attached to an acoustic medium, in accordance with embodiments.

FIG. 1B shows a top view of a MUT array, in accordance with embodiments.

DETAILED DESCRIPTION

Figure 1C:
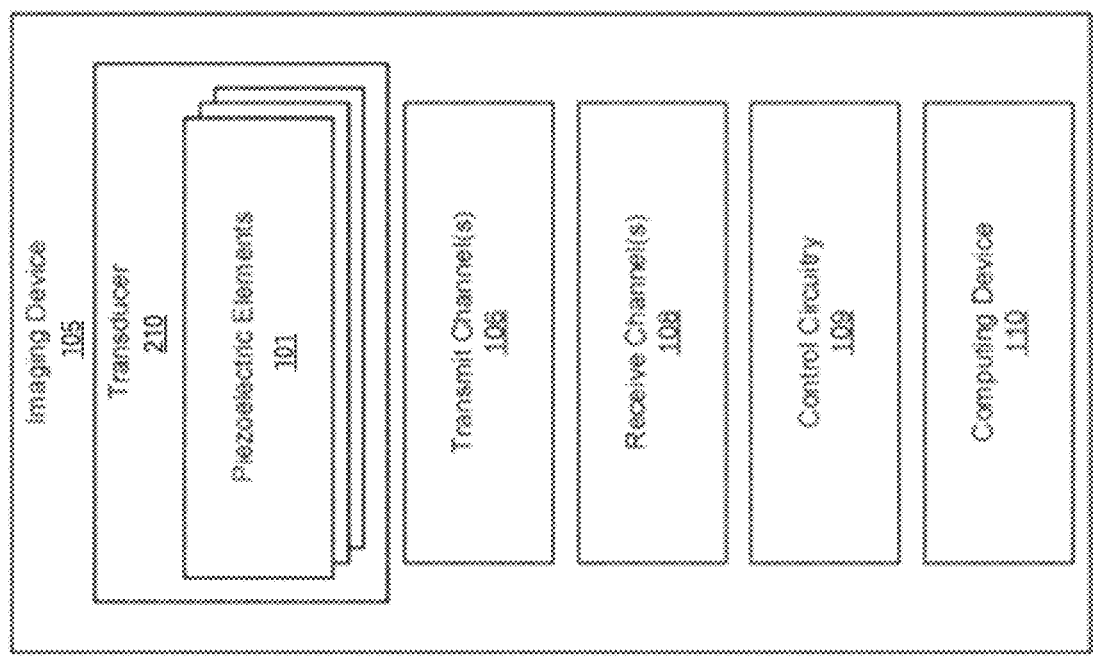
FIG. 1C is a block diagram of an imaging device, in accordance with embodiments.

Described herein is a multi-SOI structure for use as a substrate for microelectromechanical systems (MEMS) manufacturing, especially of micromachined ultrasound transducers (MUTs), including piezoelectric MUTs (pMUTs) and capacitive MUTs (cMUTs). In specific embodiments disclosed herein, the multi-SOI structure is a double-SOI structure.

The multi-SOI structure disclosed may confer many benefits to MUT array designers. The depth of the device, resulting from adding additional SOI layers, enables buried cavities and trenches to be etched to be longer than in single-SOI structures. The disclosed system can enable designers to have flexibility when choosing where to place trenches and how large to make the cavities and trenches in MEMs devices and arrays. This flexibility can enable enhanced ability for a MEMS MUT array to increase the output power of a generated acoustic signal for deep penetration into a subject, and to mitigate the effects of crosstalk from interfacial waves traveling through the array's silicon substrate.

Increasing the output power can be performed through the etching of buried cavities, or waveguides, in the multi-SOI substrate. The cavities may be etched so that they span multiple layers of the multi-SOI substrate. The methods disclosed herein for multi-SOI MEMS device manufacturing may enable precise control of the thickness and depth of the cavities, through multiple iterations of etching and masking. To keep the edges of cavities pristine, a layer of oxide may be applied to the cavity. The oxide may be applied by thermally growing the oxide or depositing it (e.g., by Plasma Enhanced Chemical Vapor Deposition (PECVD)).

To mitigate the effects of crosstalk, a designer may place buried trenches at various locations within the multi-SOI substrate. A trench may introduce an impedance mismatch between the substrate of the MEMS device and whatever material is within the cross-talk trench. This impedance mismatch can disrupt cross-talk waves through attenuation, reflection, and scattering. Designers may etch trenches to various depths and at various locations near cavities. In many cases, the pattern of trenches etched need not be uniform across a MEMS device (e.g., MUT) array.

The disclosed system may enable electronic devices to communicate with one another using a through-silicon via (TSV). A TSV may be a vertical conducting structure to connect multiple silicon dice stacked vertically in a single package. Using a multiple-SOI system, a designer may be able to produce vertical electrical connections capable of connecting many devices. Using a TSV may increase interconnect and device density, shortening connections between devices, thus reducing electrical losses. A TSV may be encoded in the multi-SOI substrate from the top layer of the device to the bottom layer. For example, one may form a recess in the multi-SOI substrate, using a mask to define the width of the recess. Then, one may etch (e.g., by an anisotropic process), the recess where it is defined in the substrate. One may then fill the recess with a conducting material, such as a metal, metal alloy, or conductive ceramic compound, such as TiN or doped semiconductor or semiconductor alloys.

The multi-SOI process disclosed herein may enable better critical dimension control during the process of etching trenches and cavities in the MUT device, enhancing design flexibility. Additionally, the multi-SOI process may provide more precise alignment tolerances, mitigating effects from alignment errors. For example, the multi-SOI process may reduce tolerances necessary to compensate for alignment errors from on the order of 10 micrometers (µm) to on the order of 3 µm. Cavities and trenches in the multi-SOI structure may be etched from the top of an SOI layer, rather than from the bottom, as SOI structures are commonly etched. This may prevent the formation of artifacts, such as tapers, from the etching process.

Certain Definitions

Unless otherwise defined, all technical terms used herein have the same meaning as commonly understood by one of ordinary skill in the art to which this invention belongs. As used in this specification and the appended claims, the singular forms "a," "an," and "the" include plural references unless the context clearly dictates otherwise. Any reference to "or" herein is intended to encompass "and/or" unless otherwise stated.

MEMS Device

Figure 5:
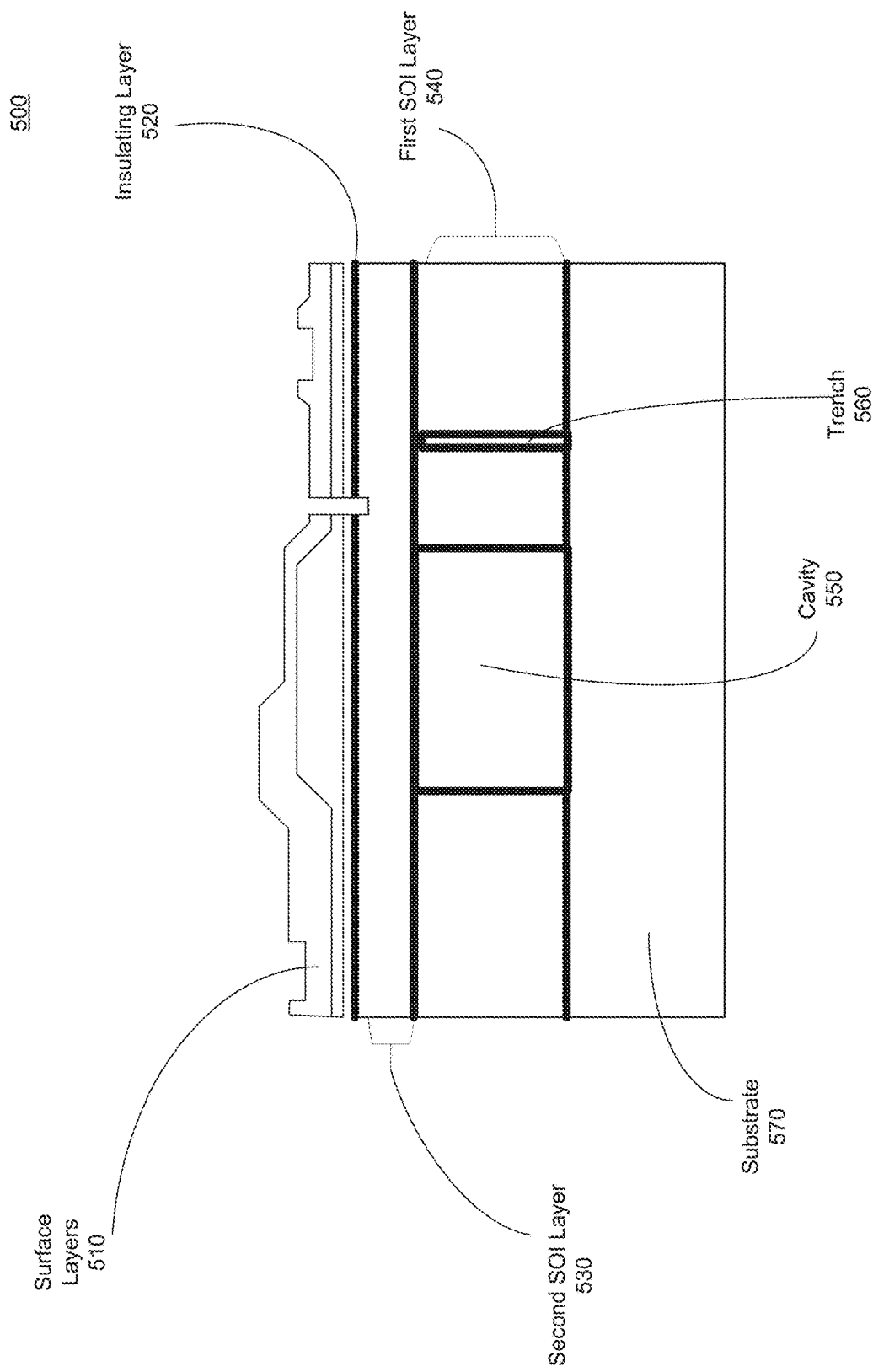
FIG. 5 illustrates a double-SOI MEMS device, in accordance with embodiments.

FIG. 5 illustrates a double-SOI MEMS device 500, in accordance with an embodiment. In this embodiment, the device is a pMUT device. In other embodiments, multi-SOI MEMS devices may have 3, 4, 5, 6, or 10 or more SOI layers. Although the semiconductor used in the embodiment is silicon, in other embodiments, the semiconductor material may be germanium, silicon-germanium, carbon-doped silicon, carbon-doped silicon-germanium, or another material. Generally, a pMUT array would implement a similar structure repeated in a periodic fashion, but with the trench placement varying spatially.

The surface layers 510 comprise a piezoelectric layer sandwiched between two conducting layers and are affixed to the double-SOI substrate. The conducting layers may comprise electrodes, which may be made of multiple layers comprising SRO ($SrRuO_3$), titanium, and platinum. When a voltage is applied to the conducting layers, the piezoelectric layer can become stressed. This stressing may actuate a membrane below the piezoelectric and conducting layers to create an acoustic output wave. The piezoelectric layer may be made of a piezoelectric material such as PZT, KNN, PZT-N, PMN-Pt, AlN, Sc—AlN, ZnO, PVDF, and LiNiO3. The thicknesses of the piezoelectric layer may vary between 100 nm and 5 µm or possibly more. In other embodiments, the surface layers 510 may also comprise a multi-layer piezoelectric element (multi-morph), comprising a plurality of piezoelectric sublayers and electrodes.

The insulating layer 520 may be an oxide layer deposited over the multi-SOI substrate. The oxide layer may be silicon dioxide, silicon nitride, or silicon oxy-nitride. The insulating layer 520 may be 0.1 µm to 0.3 µm thick. The insulator may be thermally grown or deposited.

The second SOI layer 530 may comprise a silicon membrane layer disposed above an insulating layer. The insulating layer may be an oxide layer, which may be referred to as a buried oxide layer (BOX). However, the insulating layer may also be composed of a non-oxide insulator, such as sapphire. The insulating layer may serve to reduce parasitic capacitance in the MEMS device by physically separating conducting layers from one another, preventing them from accumulating electric charge.

The silicon membrane layer may facilitate the transmission and receipt of acoustic waves by the pMUT transducer. The transducer may transmit an acoustic wave when the piezoelectric layer is stressed, actuating the silicon membrane layer. When a reflected wave is incident on the transducer, it may provide pressure to the membrane layer, which can induce a change in charge in the piezoelectric layer.

The silicon membrane layer may be bonded to the insulating layer using silicon direct or fusion bonding. In another example, the silicon and oxide layers may be bonded using the following method: a silicon wafer may be oxidized and then implanted with an etch stop layer. Then, the oxidized layer may be bonded to a silicon wafer beneath it. Then, the bonded layers may be annealed. The silicon wafer may be polished and etched down to the etch stop layer. Finally, the etch stop layer may be removed and the top silicon layer further polished.

The first SOI layer 540 may comprise a silicon layer disposed above an insulating layer, itself disposed above a silicon substrate. The first SOI layer may be disposed underneath the second SOI layer. The first SOI layer may comprise a cavity and one or more trenches, in addition to silicon and insulating layers similar to those in the second SOI layer.

The cavity 550 may be sized with specificity to improve performance of the pMUT device. For example, the cavity may be etched to a depth spanning the semiconducting layer and insulating layers, as well as cutting into the silicon substrate to a depth. A designer may also modify the width of the cavity. Modifying the depth and width of the cavity 550 may serve to shape the output wave produced by the transducer, to provide for better penetration into the acoustic medium. Increasing the number of layers of the multi-SOI devices can increase the depth to which the cavity 550 may be etched. In some embodiments, the cavity 550 may be in a vacuum, but in other embodiments, the cavity may be filled with a gas at a predetermined pressure. A pMUT array may have some cavities filled with vacuums and others filled with gases, to respectively enable freedom of vibrational movement of the membrane in some locations and dampen the vibrational motion of the membrane in other locations.

The trench 560 may also be sized at the discretion of the designer, as well as placed within the device at the discretion of the designer. There may be one or more trenches in the double-SOI device 500, located around the perimeter of the cavity 550. The trenches may be placed at various locations within the layers of semiconducting material. The trenches may also be etched to depths spanning one or more SOI layers of the pMUT device. The distribution of trenches in the transducer array need not be uniform. Some individual pMUT elements may have multiple trenches disposed alongside them, where others may only have one trench. In addition, trenches within the pMUT array may be of various lengths and distances from the surface layers 510, depending on the needs of the double-SOI transducer system.

The substrate 570 may be a semiconductor layer, e.g., a silicon layer. The substrate 570 may also be referred to as a handle layer and may be significantly larger than either of the SOI layers.

Figure 6:
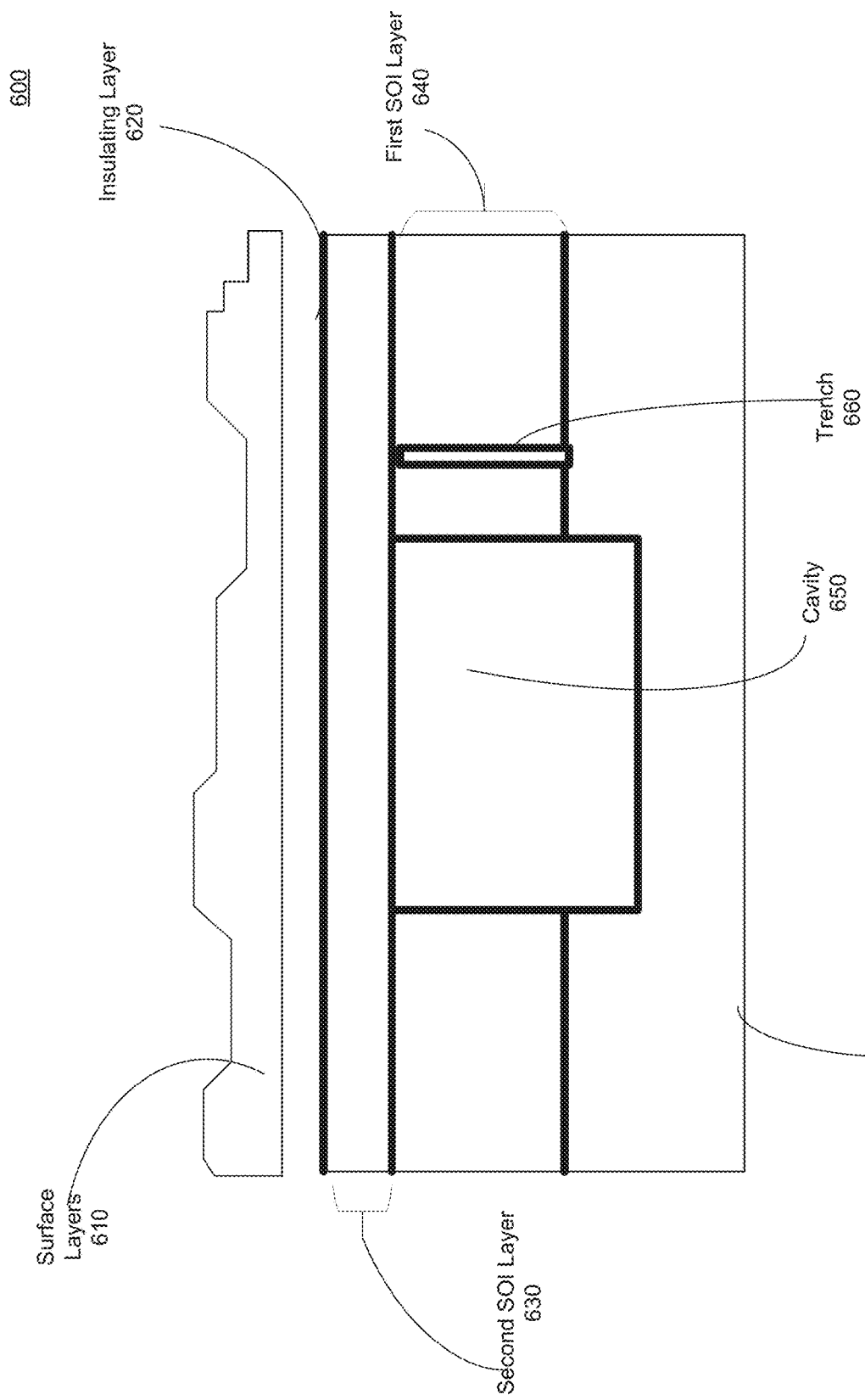
FIG. 6 illustrates a double-SOI MEMS device, in accordance with embodiments.

FIG. 6 illustrates a double-SOI MEMS device 600, in accordance with an embodiment. In this embodiment, the device is a cMUT device. Generally, a cMUT array would implement a similar structure repeated in a periodic fashion, but with the trench placement varying spatially.

Generally, a cMUT device includes a flexible membrane layer above a cavity formed in a semiconducting substrate. The membrane layer and substrate serve as electrodes, and a direct current (DC) bias is applied to them. The membrane layer may include a metallic coating. When an alternating current (AC) is applied across the membrane and substrate layer, the electrostatic forces (attractive and repulsive forces between charged objects) caused by the changing voltages causes the flexible membrane to vibrate, producing an acoustic wave.

The double-SOI MEMS cMUT device may be structured in a similar manner to the double-SOI MEMS pMUT device. The device may include, from top to bottom: surface layers 610 (which may comprise one or more electrodes), an insulating layer 620, a second SOI layer 630, a first SOI layer 640, and a semiconducting substrate 670. The first SOI layer may comprise the membrane layer, while the second SOI layer may comprise one or more cavities 650 and one or more trenches 660 for acoustic wave generation and shaping and crosstalk elimination.

MUTs

The present disclosure may be utilized in the context of imaging devices that utilize micromachined ultrasound transducer (MUT) technology, including either piezoelectric micromachined ultrasound transducer (pMUT) or capacitive micromachine ultrasonic transducer (cMUT) technologies, for example.

To operate properly, the MUTs can be designed to transmit energy into the acoustic medium to which they are attached. Take the generalized example of a MUT array in FIG. 1A. In this case, the MUTs are represented by the movable diaphragms 101a, 101b, 101c which are formed in or on top of the substrate 100 by cavities 120a, 120b, and 120c. The diaphragms 101a, 101b, 101c are coupled acoustically to the semi-infinite acoustic medium 200 at an interface 110. The acoustic medium 200 can be any substance, or a plurality of substances; common media include air, water, tissue, electrolytic gel, metal, silicone rubbers used as matching layers to the body, etc.

During operation, the diaphragms 101a-101c are excited into motion, primarily in the z-direction. The excitation is generally created by a piezoelectric effect (for piezoelectric MUTs (pMUTs)) or a capacitive effect (for capacitive MUTs (cMUTs)). In both cases, the motion of the diaphragm creates pressure waves that transmit into the acoustic medium 200. However, the diaphragm motion also creates unwanted waves outside the acoustic medium 200. The most common unwanted waves are elastic compression waves that travel within and through the substrate 100, and interfacial waves that travel along the interface 110 between the substrate 100 and the acoustic medium 200, as well as other interfaces attached to the substrate 100.

All energy radiated outside the acoustic medium 200 is generally unwanted. Not only is it wasted power, but it can interfere with the MUT's functioning. For example, in medical imaging, the elastic compression waves will rebound off other surfaces and cause artifacts such as a static image over the medically relevant image formed from the reflected energy from the acoustic medium 200. As another example, the interfacial waves that travel along the interface 110 will create cross-talk in medical imaging, creating a spot-lighting effect and unwanted ghost images.

A generalized example of a MUT array 210 is shown in FIG. 1B. The MUT array 210 comprises a substrate 100 and a plurality of MUTs 101. The plurality of MUTs 101 are affixed to a surface of the substrate. Each MUT comprises a moveable diaphragm as shown in FIG. 1A. In some embodiments, each of the MUTs 101 is a pMUT. In some embodiments, each of the MUTs 101 is a cMUT. The MUTs 101 may be arranged in a two-dimensional array 210 arranged in orthogonal directions. That is, the MUTs 101 are be formed into a two-dimensional M×N array 210 with N columns and M rows of MUTs 101. The number of columns (N) and the number of rows (M) may be the same or different. In some instances, the array 210 may be curved, e.g., to provide a wider angle of an object being imaged. In some instances, the array may offer different packing such as hexagonal packing, rather than the standard square packing displayed in FIG. 1B. In some instances, the array may asymmetrical, e.g., as described in U.S. Pat. No. 10,656,007, the entire contents of which are incorporated herein by reference.

Figure 2:
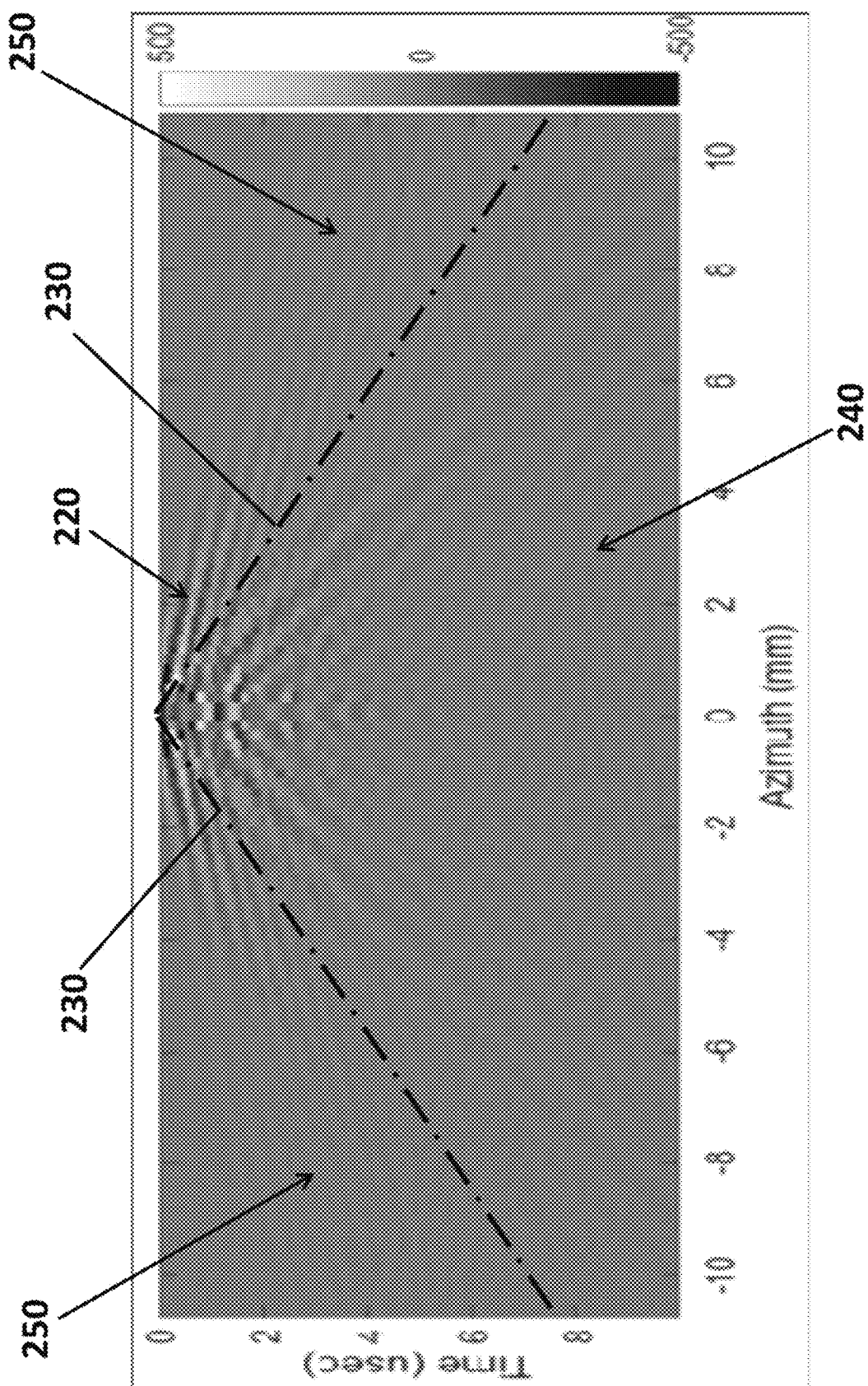
FIG. 2 is a graph showing amplitude of motion of a MUT array with 128 elements in the azimuth direction, spanning approximately 22 mm, in accordance with embodiments. The center two MUTs were actuated, and the other 126 MUTs were monitored for response. The grey level indicates positive (towards white) or negative (towards black) diaphragm deflection. The two fired elements were eliminated from the plot so that the cross-talk ripples could be visualized. The dashed lines 230 approximately represent the imaging cone, defined by wave with a 1,480 m/s velocity.

The present disclosure provides, among other things, a novel solution to address the issue of compression and interfacial waves in MUT arrays and the cross-talk they create. FIG. 2 provides an example of this cross-talk in a MUT array formed from a silicon substrate 100 coupled to a water acoustic medium 200. The diagonal ripples 220 represent traveling pressure waves. The two dashed lines 230 represent the speed of sound of the water acoustic medium (approximately 1,480 m/s). Ripples and high amplitude data 240 below these lines 230 typically represents good acoustic data. The data 250 above the two dashed lines 230 represent various forms of cross-talk.

Figure 3:
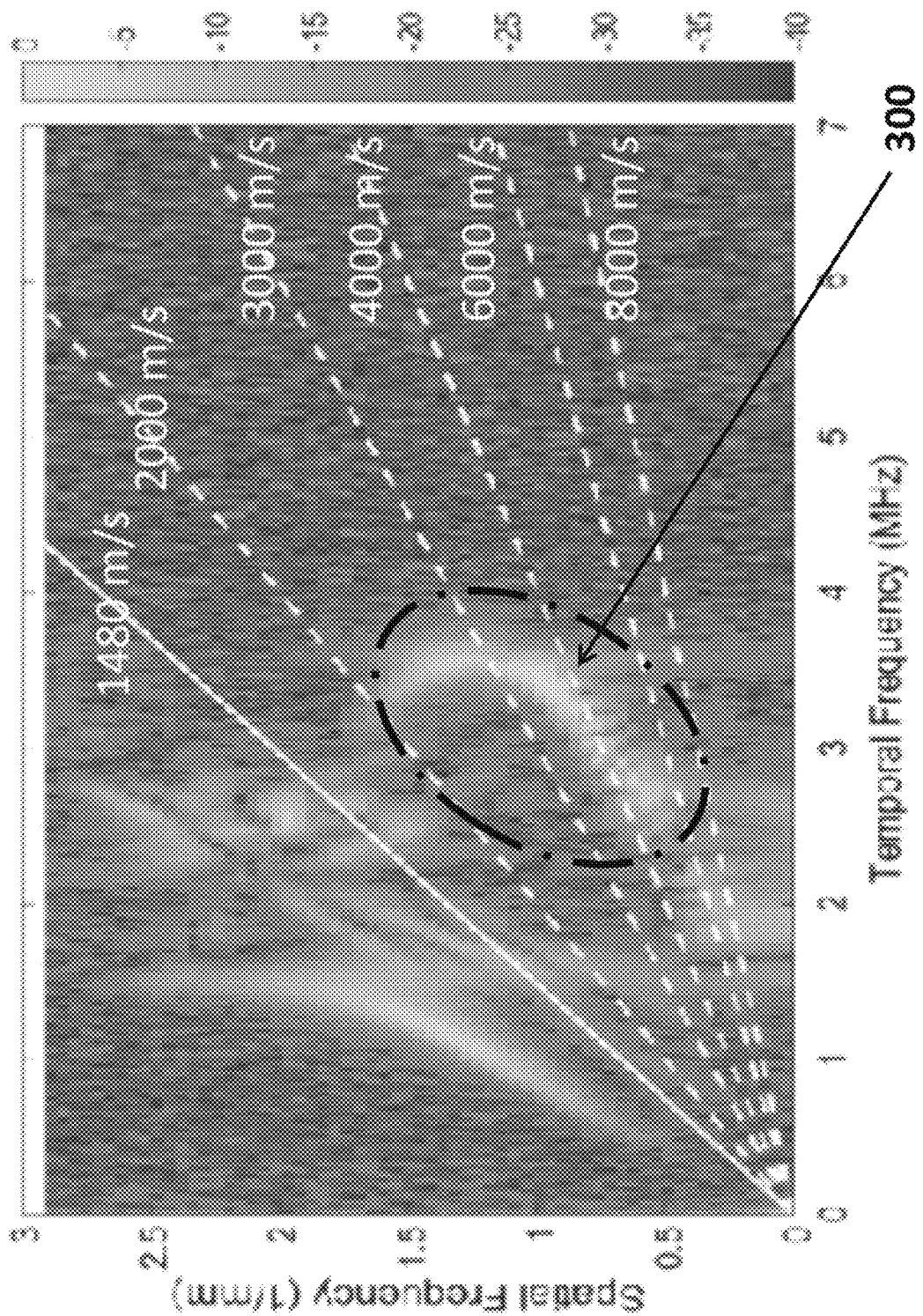
FIG. 3 is a graph showing a Fourier transform in space and time (also referred to as an f-k plot) of the data from FIG. 2, representing the data in spatial and frequency domains, in accordance with embodiments. The amplitude is plotted in dB relative to the maximum amplitude of the Fourier data, with white data having a higher amplitude black blue data. The data circled in between 2 and 4 MHz and 0.5 and 1.5 µsec is undesired cross-talk.

Taking spatial and temporal Fourier transforms of the data in FIG. 2 yields the f-k plot in FIG. 3. In FIG. 3, we can see that the cross-talk acoustic energy, circled with a dashed line 300, is distributed around 2,000 to 6,000 m/s. The longitudinal speed of sound in silicon is approximately 8,800 m/s, while the interfacial wave speed for Rayleigh and Shear waves is between 5,000 and 5,500 m/s. This suggests that the cross-talk energy may be due to a combination of interfacial and bulk waves.

Figure 4:
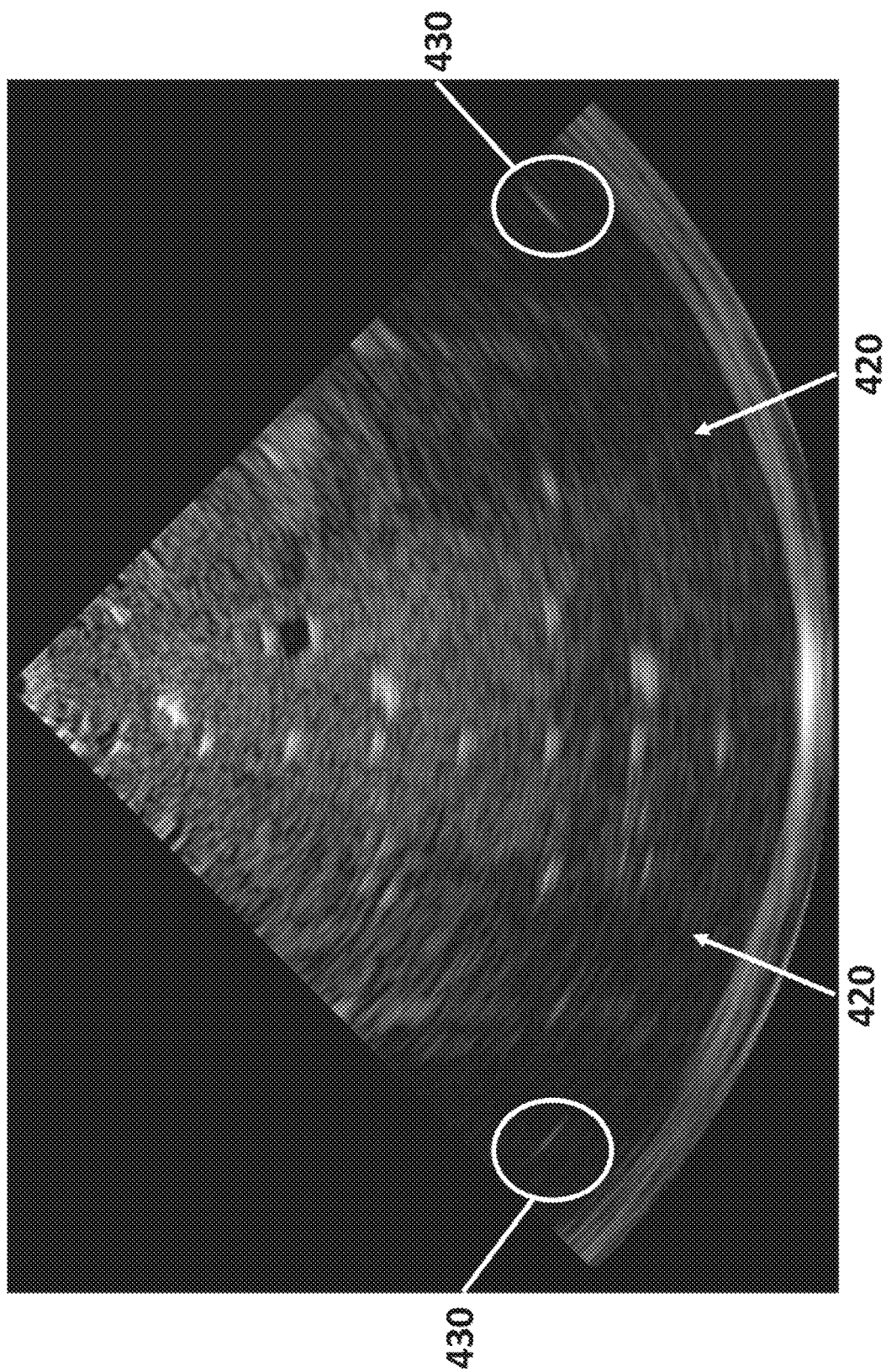
FIG. 4 is an ultrasound image taken with a MUT array similar to that of FIGS. 2 and 3, in accordance with embodiments. The "spotlight" effect is highlighted by the two arrows, while the "ghosting" artifacts are circled.

Using a MUT array like the one used to produce the output depicted in FIGS. 2 and 3 for imaging a phantom produces a result like that of FIG. 4. Two artifacts are clearly visible: (1) a "spotlight" effect 420 in which the central part of the image is brighter than the edges, and (2) "ghost" images 430 of high reflection targets are apparent at the edges of the image.

FIG. 1C is a block diagram of an imaging device 105 with selectively alterable channels 106, 108, controlled by a controller 109, and having imaging computations performed on a computing device 110 according to principles described herein. The imaging device 105 may be used to generate an image of internal tissue, bones, blood flow, or organs of human or animal bodies. Accordingly, the imaging device 105 may transmit a signal into the body and receives a reflected signal from the body part being imaged. Such imaging devices may include either pMUTs or cMUTs, which may be referred to as transceivers or imagers, which may be based on photo-acoustic or ultrasonic effects. The imaging device 105 can be used to image other objects as well. For example, the imaging device 105 can be used in medical imaging; flow measurements in pipes, speaker, and microphone arrays; lithotripsy; localized tissue heating for therapeutic; and highly intensive focused ultrasound (HIFU) surgery.

In addition to use with human patients, the imaging device 105 may be used to get an image of internal organs of an animal as well. Moreover, in addition to imaging internal organs, the imaging device 105 may also be used to determine direction and velocity of blood flow in arteries and veins as in Doppler mode imaging and may also be used to measure tissue stiffness.

The imaging device 105 may be used to perform different types of imaging. For example, the imaging device 105 may be used to perform one dimensional imaging, also known as A-Scan, two dimensional imaging, also known as B scan, three dimensional imaging, also known as C scan, and Doppler imaging. The imaging device 105 may be switched to different imaging modes and electronically configured under program control.

To facilitate such imaging, the imaging device 105 includes an array of pMUT or cMUT transducers 210, each transducer 210 including an array of transducer elements (i.e., MUTs) 101. The MUTs 101 operate to 1) generate the pressure waves that are passed through the body or other mass and 2) receive reflected waves off the object within the body, or other mass, to be imaged. In some examples, the imaging device 105 may be configured to simultaneously transmit and receive ultrasonic waveforms. For example, certain MUTs 101 may send pressure waves toward the target object being imaged while other MUTs 101 receive the pressure waves reflected from the target object and develop electrical charges in response to the received waves.

Figure 1D:
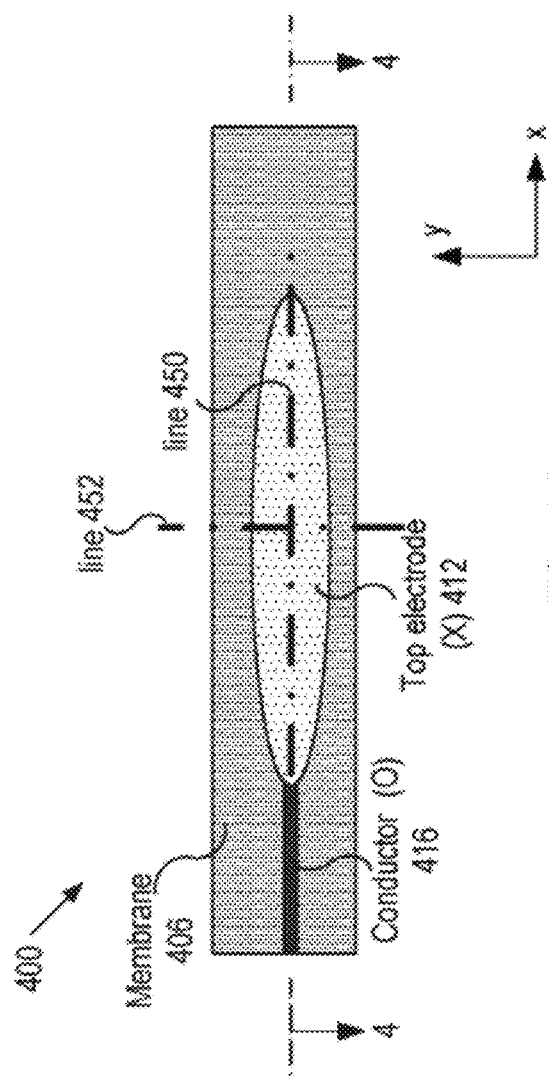
FIG. 1D shows a top view of a MUT, in accordance with embodiments.
Figure 1E:
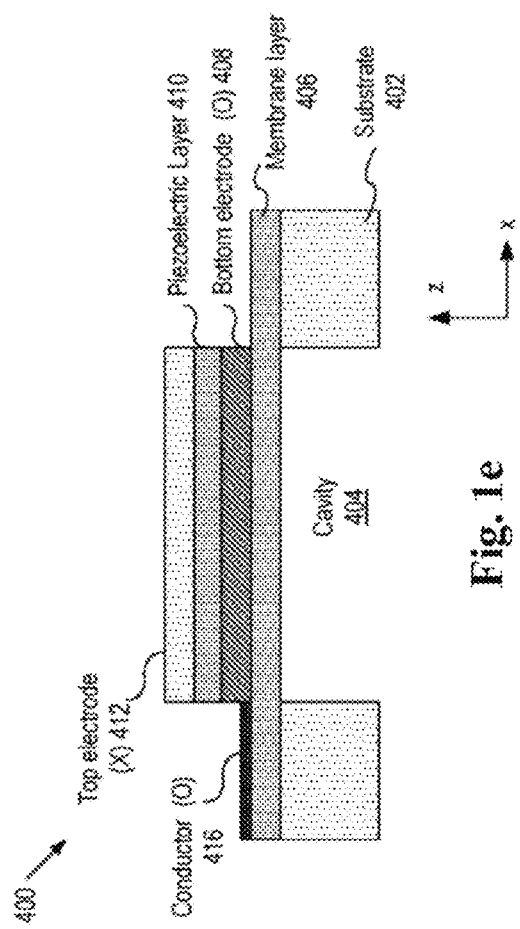
FIG. 1E shows a cross-sectional view of a MUT, taken along a direction 4-4 in FIG. 1D, in accordance with embodiments.

FIG. 1D shows a top view of an exemplary MUT 400 (in this example, a pMUT). FIG. 1E shows a cross-sectional view of the MUT 400 in FIG. 1D, taken along the line 4-4, according to embodiments of the present disclosure. The MUT 400 may be substantially similar to the MUT 101 described herein. As depicted, the MUT may include: a membrane layer 406 suspended from a substrate 402 and disposed over a cavity 404; a bottom electrode (O) 408 disposed on the membrane layer (or, shortly membrane) 406; a piezoelectric layer 410 disposed on the bottom electrode (O) 408; and a top electrode (X) 412 disposed on the piezoelectric layer 410.

MUTs, whether cMUTs or pMUTs, can be efficiently formed on a substrate leveraging various semiconductor wafer manufacturing operations. Semiconductor wafers may come in 6 inch, 8 inch, and 12 inch sizes and are capable of housing hundreds of transducer arrays. These semiconductor wafers start as a silicon substrate on which various processing steps are performed. An example of such an operation is the formation of $SiO_2$ layers, also known as insulating oxides. Various other steps such as the addition of metal layers to serve as interconnects and bond pads are performed to allow connection to other electronics. Yet another example of a machine operation is the etching of cavities (e.g., cavity 404 in FIG. 1E) in the substrate.

Method of Manufacture for pMUT with Trenches

An exemplary method of manufacture for a double-SOI pMUT device with trenches is now described.

(a) First, a first SOI substrate comprising a first SOI layer, may be provided. The first SOI layer may comprise a first silicon layer, a buried oxide layer, and a second silicon layer, with the first silicon layer and second silicon layer typically being single-crystal silicon. An oxide layer (typically silicon dioxide) may be deposited over the first silicon layer.

(b) A cavity and one or more cross-talk trenches may be patterned and etched in the first SOI layer to form a "handle" wafer. The trench etch may comprise four steps: (1) etching the oxide layer, (2) etching the first silicon layer via DRIE, (3) etching the BOX (typically via dry RIE etching, or in some cases, via wet etching), and (4) etching the second silicon layer via DRIE to the desired depth. Following etching, an oxide layer may be deposited above the cavity and the trenches and may serve to narrow the trench if desired. A second SOI "device" wafer may then be fusion bonded to the "handle" to form the buried trenches and cavity in the double-SOI substrate. The "device" wafer may form the second SOI layer of the double-SOI substrate, with the first silicon layer of the first SOI layer forming the second silicon layer of the second SOI layer.

Most SOI wafers are silicon, meaning that the silicon layers of the "device" and "handle" wafers will typically be single crystal silicon. The insulator BOX, in this case, is typically a silicon dioxide thermally grown. A silicon SOI wafer with single crystal silicon handle and device layers with an oxide BOX may typically be used. The device layer may be 5 μm, but typically varies between 100 nm and 100 μm, while the handle layer thickness typically varies between 100 μm and 1000 μm. The BOX is typically between 100 nm and 5 μm, but 1 μm may be used, in many cases.

(c) If desired, the backside of the wafer or handle can be thinned via grinding and optionally polished at this point. In many embodiments, the handle layer is thinned from 500 μm to 300 μm thick. Common thicknesses typically vary between 50 μm and 1000 μm.

(d) The cavity-side trenches 105 (of FIG. 1C) may be patterned and etched. The backside of the substrate 100 may be etched typically via DRIE (deep reactive ion etching).

(e) The cavity etch can be timed. The cavity may be etched at the same time as the cavity-side trench 105. The etch may stop selectively on the BOX. The cavity can be etched via other techniques such as KOH, TMAH, HNA, and RIE. The wafer can be considered complete after photoresist strip.

(f) An insulating layer can then be deposited over the double-SOI substrate. The insulating layer is typically some form of $SiO_2$, about 0.1 μm to 3 μm thick. It is commonly deposited via thermal oxidation, PECVD deposition, or by another technique.

(g) A first metal layer 408 (of FIG. 1E) (also referred to as M1 or metal 1) can then be deposited. Typically, this is a combination of films that adhere to the substrate, prevent diffusion of the piezoelectric, aid the piezoelectric in structured deposition/growth, and which is conductive. SRO ($SrRuO_3$) may be used for structured film growth, on top of Pt for a diffusion barrier and conduction, on top of Ti as an adhesive layer (for Pt to $SiO_2$). Usually, these layers are thin, less than 200 nm, with some films 10 to 40 nm. Stress, manufacturing, and cost issues will usually limit this stack to less than 1 μm. The conductor (Pt) is typically thicker than the structuring layer (SRO) and adhesion layer (Ti). Other common structuring layers, rather than SRO, include (La0.5Sr0.5)CoO3, (La0.5Sr0.5)MnO3, LaNiO3, RuO2, IrO2, BaPbO3, to name a few. Pt can be replaced with other conductive materials such as Cu, Cr, Ni, Ag, Al, Mo, W, and NiCr. These other materials usually have disadvantages such as poor diffusion barrier, brittleness, or adverse adhesion, and Pt is the most common conductor used. The adhesion layer, Ti, can be replaced with any common adhesion layers such as TiW, TiN, Cr, Ni, Cr, etc.

(h) A piezoelectric material 410 can then be deposited. Some common examples of suitable piezoelectric materials include: PZT, KNN, PZT-N, PMN-Pt, AlN, Sc—AlN, ZnO, PVDF, and LiNiO3. The thicknesses of the piezoelectric layer may vary between 100 nm and 5 μm or possibly more.

(i) A second metal layer 412 (also referred to as M2 or metal 2) can then be deposited. This second metal layer 412 may be similar to the first metal layer 408 and may serve similar purposes. For M2, the same stack as M1 may be used, but in reverse: Ti for adhesion on top of Pt to prevent diffusion on top of SRO for structure.

(j) The second metal layer or M2 412 may then be patterned and etched, stopping on the piezoelectric layer. Etches can be made in many ways herein, for example, via RIE (reactive ion etching), ion mill, wet chemical etching, isotropic gas etching, etc. After patterning and etching, the photoresistor used to pattern M2 may be stripped, via wet and/or dry etching. In many embodiments for manufacturing cMUTs and pMUTs described herein, any number of ways of etching may be used, and the photoresist is typically stripped after most pattern and etch steps.

(k) The piezoelectric layer may then be similarly patterned and etched, stopping at the first metal layer or M1 408. Typically, wet, RIE, and/or ion mill etches are used.

(l) The first metal layer or M1 408 may then be similarly patterned and etched, stopping on the dielectric insulating layer.

(m) If desired, one or both of the following may be added:
(1) An H2 barrier. H2 diffusion into the piezoelectric layer can limit its lifetime. To prevent this, an H2 barrier can be used. 40 nm of ALD (atomic layer deposition) aluminum oxide (Al2O3) may be used to accomplish this. Other suitable materials may include SiC, diamond-like carbon, etc.

(2) A redistribution layer (RDL). This layer can provide connectivity between M1 and M2 and other connections (e.g., wirebonds, bump bonds, etc.). An RDL can be formed by first adding a dielectric such as oxide, etching vias in the dielectric, depositing a conductor (typically Al), and finally patterning the conductor. Additionally, one might add a passivation layer (typically oxide+nitride) to prevent physical scratches, accidental shorting, and/or moisture ingress.

It will be understood by one of ordinary skill in the art based on the teachings herein that other processes may be used to achieve similar end results.

Method of Manufacture for cMUT with Trenches (a) First, a first SOI layer typically with a first layer of single crystal silicon, a buried oxide layer, and a single crystal silicon substrate, may be provided.

(b) The first SOI layer may then be thermally oxidized.

(c) The cavities may be patterned and etched in the oxide to generate a "handle" wafer. This is typically accomplished through a plasma etch of the oxide or a wet etch (e.g., HF).

(d) If desired, the buried cross-talk trenches may be patterned and etched in the oxide of the "handle" wafer. This is typically accomplished through a plasma etch of the oxide or a wet etch (e.g., HF).

(e) A "device" wafer comprising a silicon layer and a buried oxide layer, with an additional oxide layer deposited above the silicon layer, may then be fusion bonded to the patterned oxide "handle" wafer. If desired, the "device" wafer may be patterned and etched (e.g., via DRIE) to correspond to the buried trenches 104 in the "handle" wafer prior to fusion bonding, such that fusion bonding of the "handle" and the "device" wafers forms the buried trenches 104 (e.g., as shown in FIG. 9B).

(f) The "device" wafer may be ground and polished to the desired diaphragm thickness.

It will be understood by one of ordinary skill in the art based on the teachings herein that other processes may be used to achieve similar end results.

Variable Oxide Thickness Process

Figure 7:
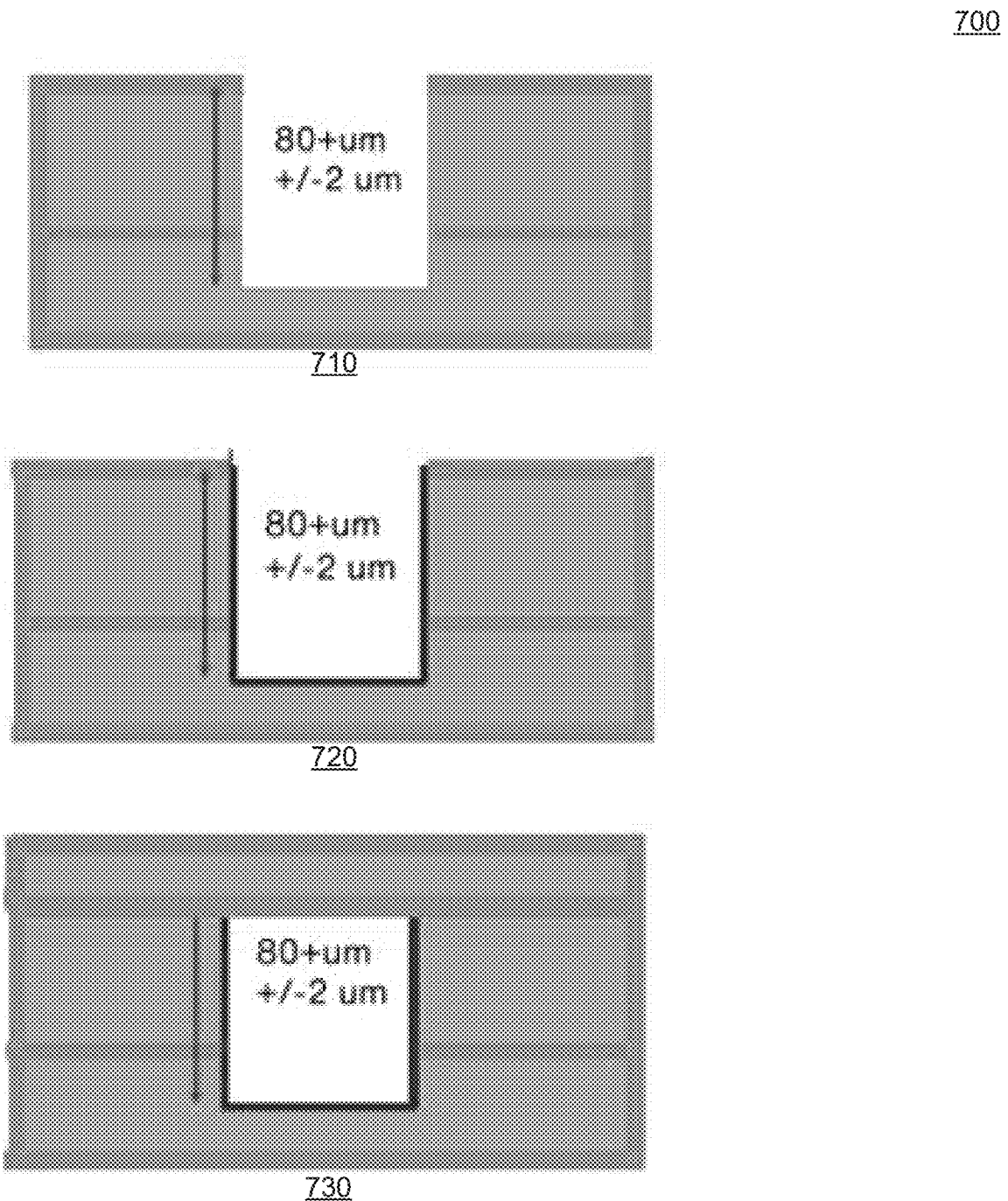
FIG. 7 illustrates a process for etching cavities and trenches in the "handle" wafer of a double-SOI substrate.

FIG. 7 illustrates a process 700 for etching cavities and trenches in the "handle" wafer of a double-SOI substrate. Initially, the first layer is a 65 µm SOI wafer including a BOX layer of 1 µm. In other embodiments, the SOI wafer may be between 40 and 80 µm, and the BOX layer may be between 1 and 5 µm. The SOI layer has been oxidized. Beneath the SOI wafer is a semiconductor substrate, which may be a "handle" wafer 300-700 µm thick.

Prior to etching, a photomask may be used to define the cavity. The photomask may define a height and a width of the cavity, or heights and widths of cavities for a MEMS array.

In a first operation 710, the cavity may be etched. First, the oxide may be etched, using a wet or a dry etching method. Then, the silicon layer of the SOI wafer may be etched using DRIE etching. The BOX layer may be again etched using a wet or a dry (e.g., ME) etching method. Finally, the silicon substrate may be etched. In this embodiment, the cavity is etched to a depth of 80 µm+/−2 µm (65 µm all the way through the first SOI layer and 15 µm into the handle layer).

In a second operation 720, after etching the cavity is complete, the cavity may then be oxidized. Oxidation can keep the cavity shape intact, preserving the ability of the cavity to serve as a waveguide. If the oxide is not applied to the cavity, the cavity may have tapered edges instead of straight edges.

In a third operation 730, the first SOI layer may be bonded to a 5 µm SOI wafer (which makes up the second SOI layer). The second SOI layer can additionally include an oxide thermally grown or deposited above the silicon layer.

Although the above steps show process 700 in accordance with many embodiments, a person of ordinary skill in the art will recognize many variations based on the teaching described herein. The steps may be completed in a different order. Steps may be added or omitted. Some of the steps may comprise sub-steps. Many of the steps and sub-steps may be repeated as often as beneficial.

In some embodiments, the cavity may not be etched into the semiconductor or silicon layer below the top layer of the device. In some embodiments, the cavity may be etched into the top layer. In other embodiments, particularly in embodiments with more than two layers, a cavity may be etched into a layer lower than the layer just below the top layer of the device.

Variable Cavity and Trench Depth Process

Figure 8:
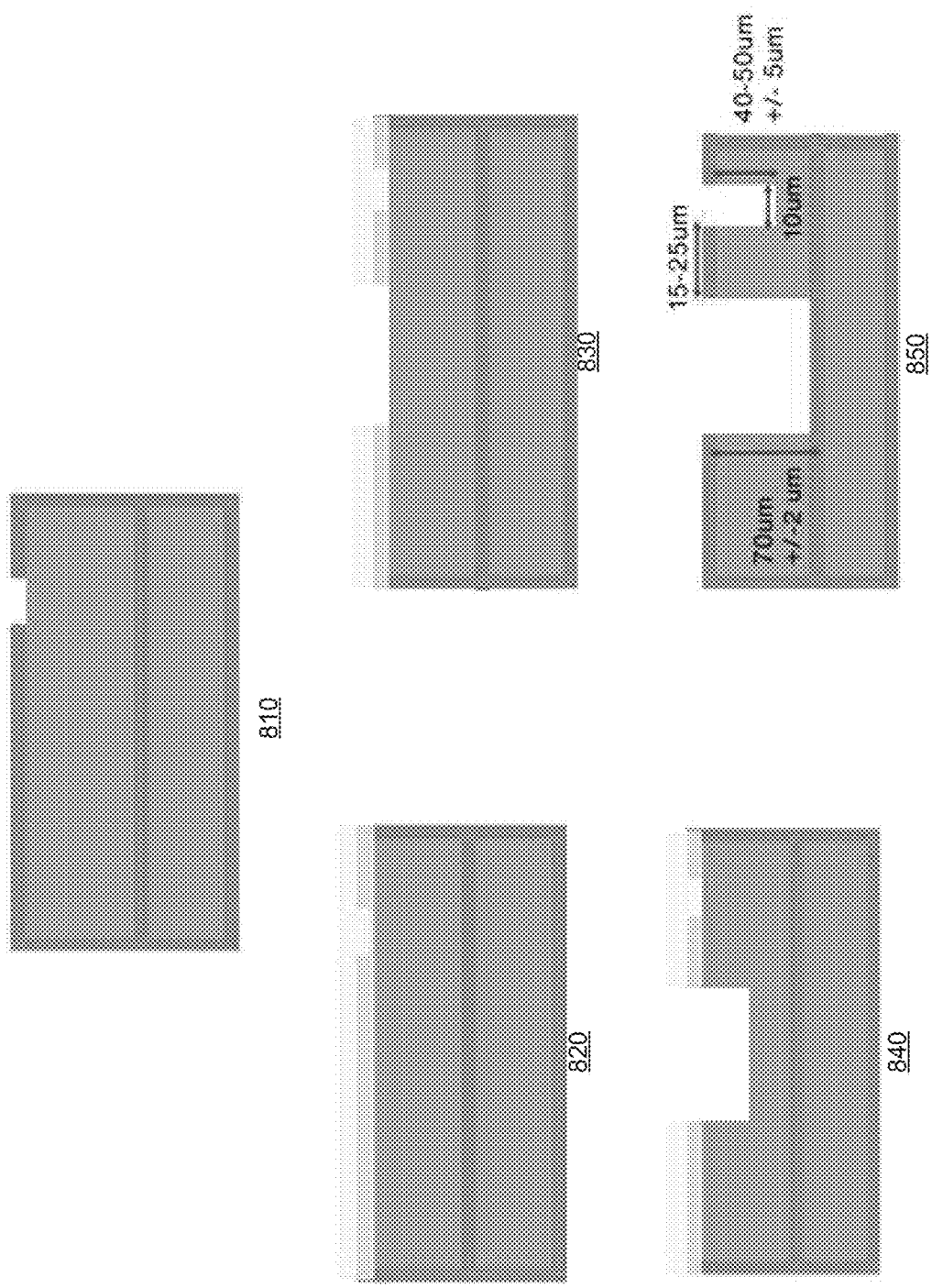
FIG. 8 illustrates a process for etching cavities and trenches in the "handle" wafer of a double-SOI substrate.

FIG. 8 illustrates a process 800 for etching cavities and trenches in the "handle" wafer of a double-SOI substrate.

In a first operation 810, the operator defines a trench size. This may be performed by using a photomask to determine a location of the trench on the wafer. The photomask may be configured to define a particular pattern or configuration of trenches throughout the substrate. For example, the locations on the wafer where transducer elements may be placed may be regularly spaced within the mask, but different configurations of trenches may be placed alongside the spaces designated for the transducer elements. Following the masking process, operator may etch the oxide layer of the "handle" wafer to define the trench. The oxide layer may be dry (e.g., RIE) etched or wet (e.g., hydrofluoric acid (HF)) etched.

In a second operation 820, photoresist may be applied to the oxide surface of the wafer, using a spin coating method. The photoresist layer may be a polymeric material sensitive to ultraviolet light. In other embodiments, alternate methods may be used to coat the oxide surface of the wafer, including spraying, roller coating, dip coating, and extrusion coating.

In a third operation 830, the photoresist layer may be pattern etched to define a cavity. Pattern etching may be performed by exposing the photoresist layer to ultraviolet light through a mask to obtain the desired pattern. An infrared aligner may align the mask on the wafer to precisely etch the pattern.

In a fourth operation 840, the cavity may be partially etched, while the trench opening is still protected by the photoresist layer. Thus, the etching of the cavities and the trenches (which may be etched to different depths), may be controlled separately. Were the photoresist layer not applied, an etchant used to etch the cavity may partially etch the trench as well.

In a fifth operation 850, the photoresist may be stripped (e.g., chemically). After the photoresist is stripped, the oxide layer may serve as a hard mask to complete the etching of the trenches and cavities.

The operator may use oxide as a mask to etch the cavity below the BOX layer, and etch the trench. The operator may then deposit an oxide onto the cavity. Applying an oxide to the cavity enables the cavity to have straight edges, rather than tapered edges, enabling better shaping of an acoustic wave.

In MEMS devices with additional layers, an operator may continue to use below oxide layers as masks to etch deeper cavities and trenches.

Although the above steps show process 800 in accordance with many embodiments, a person of ordinary skill in the art will recognize many variations based on the teaching described herein. The steps may be completed in a different order. Steps may be added or omitted. Some of the steps may comprise sub-steps. Many of the steps and sub-steps may be repeated as often as beneficial.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention.

What is claimed is:

1. A multi-silicon on insulator (SOI) micromachined ultrasonic transducer (MUT) device comprising:
    a multi-SOI substrate comprising a first SOI layer and a second SOI layer disposed above the first SOI layer, such that the second SOI layer forms a top surface of the multi-SOI substrate; and
    a MUT comprising a membrane and being affixed to the top surface of the multi-SOI substrate,
    wherein each of the first SOI layer and the second SOI layer comprises an insulating layer and a semiconducting layer,
    wherein the first SOI layer further comprises a cavity and one or more trenches, the cavity being located under the membrane of the MUT and having a first depth, and the one or more trenches being located at least partially around a perimeter of the cavity and having a second depth that at least partially overlaps the first depth within the multi-SOI substrate.

2. The device of claim 1, wherein the MUT is a piezoelectric micromachined ultrasound transducer (pMUT).

3. The device of claim 1, wherein the MUT is a capacitive micromachined ultrasound transducer (cMUT).

4. The device of claim 1, wherein the second SOI layer is 40-80 micrometers in height.

5. The device of claim 1, wherein the insulating layer is a buried oxide (BOX) layer.

6. The device of claim 5, wherein the BOX layer is 1-5 micrometers in height.

7. The device of claim 5, wherein the semiconducting layers of the first SOI layer and at least the second SOI layer are handle layers, and wherein the cavity is created by etching at least one of the handle layers and the BOX layer.

8. The device of claim 1, further including a through silicon via.

9. The device of claim 1, wherein the semiconducting layer is a silicon membrane layer.

10. The device of claim 1, wherein the multi-SOI substrate is a double-SOI substrate.

11. The device of claim 1, wherein the cavity includes a deposited oxide layer.

12. The device of claim 1, wherein each of the one or more trenches is etched to a depth spanning one or more layers of the device.

13. The device of claim 1, further comprising a handle layer below the first SOI layer.

14. The device of claim 13, wherein the handle layer is a semiconductor layer.

15. The device of claim 1, wherein the semiconducting layer of the second SOI layer includes a metallic coating.

16. The device of claim 1, wherein the cavity is filled with a gas.

17. The device of claim 1, wherein the cavity is maintained under vacuum pressure.

18. The device of claim 1, wherein the insulating layer comprises a non-oxide insulator.

19. A multi-silicon on insulator (SOI) micromachined ultrasonic transducer (MUT) array comprising:
    a multi-SOI substrate comprising a first SOI layer and a second SOI layer disposed above the first SOI layer, such that the second SOI layer forms a top surface of the multi-SOI substrate; and
    a MUT having comprising a membrane and being affixed to the top surface of the multi-SOI substrate,
    wherein each of the first SOI layer and the second SOI layer comprises an insulating layer and a semiconducting layer,
    wherein the first SOI layer further comprises a cavity and one or more trenches, the cavity being located under the membrane of the MUT and having a first depth, and the one or more trenches being located at least partially around a perimeter of the cavity and having a second depth that at least partially overlaps the first depth within the multi-SOI substrate.

* * * * *